United States Patent
Abe et al.

(10) Patent No.: US 6,933,963 B2
(45) Date of Patent: Aug. 23, 2005

(54) TELEVISION STANDARD CONVERTER FOR ENDOSCOPE

(75) Inventors: Kazunori Abe, Saitama (JP); Fujio Okada, Saitama (JP)

(73) Assignee: Fujinon Corporation, Saitama (JP)

( * ) Notice: Subject to any disclaimer, the term of this patent is extended or adjusted under 35 U.S.C. 154(b) by 469 days.

(21) Appl. No.: 10/093,605

(22) Filed: Mar. 11, 2002

(65) Prior Publication Data

US 2002/0135675 A1 Sep. 26, 2002

(30) Foreign Application Priority Data

Mar. 26, 2001 (JP) ........................................ 2001-087392

(51) Int. Cl.[7] ................................................ H04N 7/18
(52) U.S. Cl. ............................ 348/65; 600/101; 348/71
(58) Field of Search ..................... 348/65–92; 600/101; H04N 7/18

(56) References Cited

U.S. PATENT DOCUMENTS 5,598,218 A * 1/1997 Inoue .......................... 348/443
6,476,852 B1 * 11/2002 Okada ......................... 348/65
2001/0022612 A1 * 9/2001 Higuchi et al. ............... 348/65

* cited by examiner

*Primary Examiner*—Tung Vo
(74) *Attorney, Agent, or Firm*—Snider & Associates; Ronald R. Snider

(57) ABSTRACT

To provide a first memory for storing an odd field data, a second memory for storing an even field data acquired in an NTSC system, a third memory for storing the same video data stored in the first and second memories, and a TV standard conversion circuit. For the data in a period for which a writing of a next data overtakes reading of the data from the first memory or the second memory, a writing into the third memory is inhibited, and the data is read from the third memory, whereby the signal of the NTSC system is converted into the signal of a PAL system. In this manner, an excellent video is displayed on a PAL monitor without any the bar noise.

3 Claims, 5 Drawing Sheets

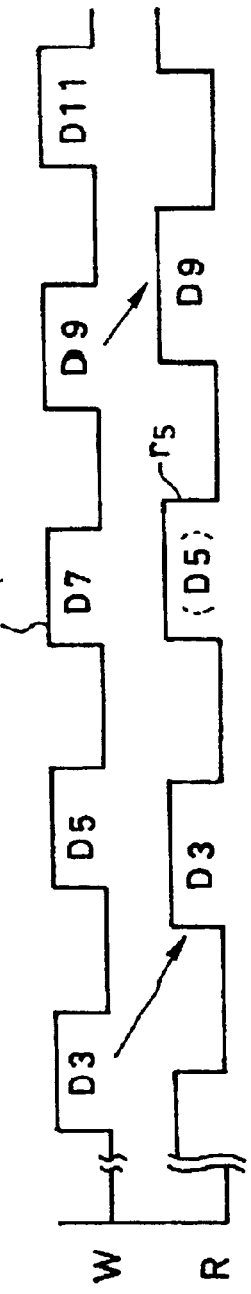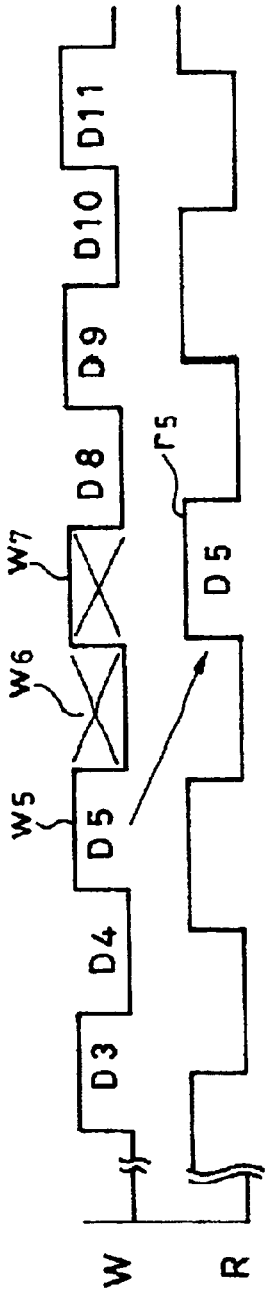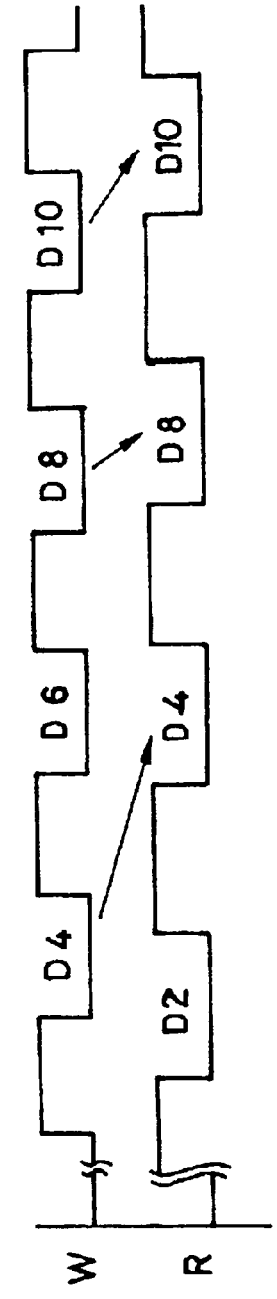
FIG. 4A FIRST MEMORY
FIG. 4B THIRD MEMORY
FIG. 4C SECOND MEMORY

TELEVISION STANDARD CONVERTER FOR ENDOSCOPE

BACKGROUND OF THE INVENTION

This application claims the priority of Japanese Patent Applications No. 2001-87392 filed on Mar. 26, 2001 which is incorporated herein by reference.

1. Field of the Invention

The present invention relates to a television standard converter for endoscope in which a video signal of NTSC system is converted into a video signal of PAL system.

2. Description of the Related Art

In Japan, an electronic endoscopic apparatus has a monitor of an NTSC (National Television System Committee) system, but it is demanded that the electronic endoscopic apparatus may have a monitor of a PAL (Phase Alternation by Line) system that is employed mainly in Europe. The number of scanning lines (horizontal lines) for this television monitor is 525 in the NTSC system, or 625 in the PAL system. Through the interpolation process of a video signal conversion circuit, the data of 525 scanning lines is converted into the data of 625 scanning lines.

That is, a CCD (Charge Coupled Device) as a solid image pickup element adapted to the scanning lines of the NTSC system is provided at a top end of an electronic endoscope, whereby an output signal of this CCD undergoes a predetermined video processing to acquire a signal (horizontal line data of 525 lines), which is once stored at a timing of the NTSC system in a memory, and read at a timing of the PAL system from this memory. And this signal is converted into the horizontal line data of 625 lines through an interpolation process to increase the number of scanning lines, and form a video signal adapted to the PAL system.

However, in the signal conversion between the NTSC system and the PAL system in the electronic endoscopic apparatus, there was a problem that a bar noise occurs horizontally on the monitor, because they have a different vertical scanning period. Namely, the vertical synchronization signals of both television standards are shown in FIGS. 5A and 5B, in which a field signal is obtained for a vertical scanning period of 1/60 sec. (about 16.7 ms) in the NTSC system as shown in FIG. 5A, while a field signal is obtained for a vertical scanning period of 1/50 sec. (20 ms) in the PAL system as shown in FIG. 5B.

FIG. 6 shows a state in which a write operation of video signal data overtakes a read operation in an NTSC-PAL conversion memory. If a write period of the odd field signal data D51 (51st) of the NTSC system overlaps a read period of the odd field signal data D50 (50th) of the PAL system, the writing of the next data overtakes the reading of the data in the PAL system at the time of line Ln, for example. Then, the bar noise occurs horizontally at the time of overtaking, and a video of one field is formed in the video data at different time, whereby if there is a movement in the observed subject, an unclear video is displayed on the monitor.

SUMMARY OF THE INVENTION

The present invention has been achieved in the light of the above-mentioned problems, and it is an object of the invention to provide a television standard converter for endoscope that can display a clear video by removing the bar noise on a monitor.

In order to attain the above object, the present invention provides a television standard converter for endoscope comprising: an image pickup element drive circuit for driving an image pickup element based on the NTSC system; a video signal processing circuit for forming a video signal of the observed subject on the basis of an output signal of the image pickup element; a main memory for memorizing the video signal data acquired at a timing of the NTSC system in sequence; an auxiliary memory for memorizing the same video signal data stored in the main memory; and a conversion circuit for converting a video signal of the NTSC system into a video signal of the other television standard, in which the video signal data is read from the main memory at a timing of the other television standard, and for the data in a period for which the writing of the next data overtakes the reading of the data from the main memory, the writing of the data into the auxiliary memory is inhibited, and the data is read from the auxiliary memory.

With the above configuration, a signal of the NTSC system read from the image pickup element undergoes a predetermined video processing, and then is stored in a first memory and a second memory as a main memory and a third memory as the auxiliary memory. For example, the odd field data or the even field data is written in the first and third memories or the second and third memories alternately at a rate of 1/60 sec. per vertical scanning period. And the odd field data or the even field data is read from the first memory or the second memory alternately at a rate of 1/50 sec. per vertical scanning period of the PAL system.

On the other hand, a period for which the writing of the next data overtakes the reading of the data from the first memory or the second memory is defined in advance as a field number from a predetermined start point for writing or reading in each memory. For example, in the case where the writing of the 51st odd field data overtakes the reading of the 50th odd field data, the writing into the third memory is inhibited, and the 50th odd field data is read from the third memory. Consequently, the field data is not employed in a condition where the writing overtakes the reading, and the bar noise is prevented from occurring.

Also, the conversion circuit reads the video signal data memorized in the auxiliary memory to provide alternately the odd field data (odd lines) and the even field data (even lines) output from the image pickup element.

BRIEF DESCRIPTION OF THE DRAWINGS

FIGS. 4A to 4C are timing charts showing the write operation and the read operation in the first to third memories in the embodiment of the invention;

DETAILED DESCRIPTION OF THE PREFERRED EMBODIMENTS

Figure 1:
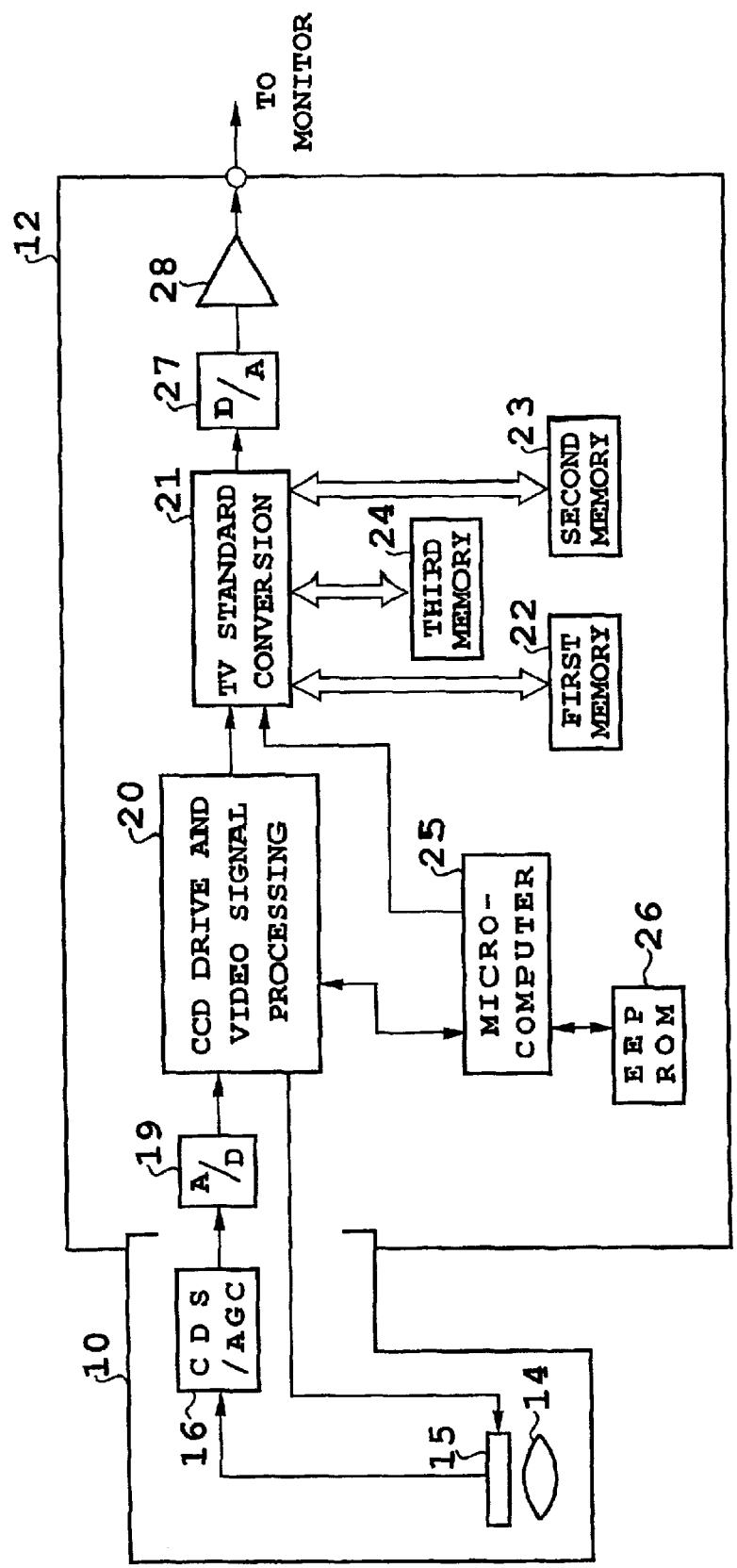
FIG. 1 is a block diagram showing a circuit configuration of an electronic endoscopic apparatus according to an embodiment of the present invention.

FIG. 1 shows a configuration of an electronic endoscopic apparatus according to an embodiment of the invention, in which an electronic endoscope 10 is connected to a processor 12. This electronic endoscope 10 is provided with a CCD 15 via an objective optics system 14 at its top end portion, and has a CDS/AGC circuit 16 for making a correlating double sampling (CDS) and an automatic gain control (AGC) for an output signal of this CCD 15.

On the other hand, the processor 12 is provided with an A/D converter 19 for accepting an output signal from the CDS/AGC circuit 16 and a CCD drive and video signal processing circuit 20 for issuing a drive signal to the CCD 15 and making various processings such as a color conversion process, a gamma correction and a contour highlighting for an output signal from the CCD 15. And at a later stage of this CCD drive and video signal processing circuit 20, a TV standard conversion (resolution conversion) circuit 21 for making the signal conversion of the television (TV) standard, a first memory 22 that is a main memory, a second memory 23 and a third memory 24 that is an auxiliary memory.

That is, for example, the odd field data and the even field data of the NTSC system are stored in the first memory 22 and the second memory 23, respectively, and both data are stored in the third memory 24. The TV standard conversion circuit 21 converts the horizontal line data of 525 lines of the NTSC system read from these memories 22 to 24 into the horizontal line data of 625 lines of the PAL system. This conversion is made by various methods such as a vertical or horizontal pixel-to-pixel interpolation or the like.

Also, a microcomputer 25 for controlling the TV standard conversion and generally controlling various circuits, and a ROM (EEPROM) 26 are provided. At a later stage of the TV standard conversion circuit 21, a D/A converter 27 and a buffer 28 are provided. A video signal output from this buffer 28 is supplied to a monitor of the TV standard. That is, the TV standard conversion circuit 21 can directly output a video signal of the NTSC system, and output the video signal of the NTSC system or the PAL system to the monitor by switching the video between the NTSC system and the PAL system under the control of the microcomputer 25.

Also, the ROM 26 connected to the microcomputer 25 stores the information regarding a write inhibit period for the third memory 24, corresponding to a period for which the writing of the next data overtakes the reading of the data from the first memory 22 and the second memory 23. This information corresponds to a field number (a number set within a predetermined time) that is counted from a start point $T_D$ of FIG. 3, for example.

This embodiment has the above configuration. The operation of this embodiment will be described below. First of all, in the electronic endoscopic apparatus of FIG. 1, a signal output from the CCD 15 is sampled and amplified in the CDS/AGC circuit 16, and passed through the A/D converter 19 to the CCD drive and video signal processing circuit 20 to make various processings for forming the video. An output from the CCD drive and video signal processing circuit 20 is supplied to the TV standard conversion circuit 21, but when the NTSC monitor is connected, an NTSC video signal is output through the D/A converter 27 and the buffer 28 without making the PAL conversion. Accordingly, in this case, a video of the observed subject is displayed on the NTSC monitor. On the other hand, when the PAL monitor is connected, the microcomputer 25 outputs a command for making the TV standard conversion to the TV standard conversion circuit 21.

Figure 2A:
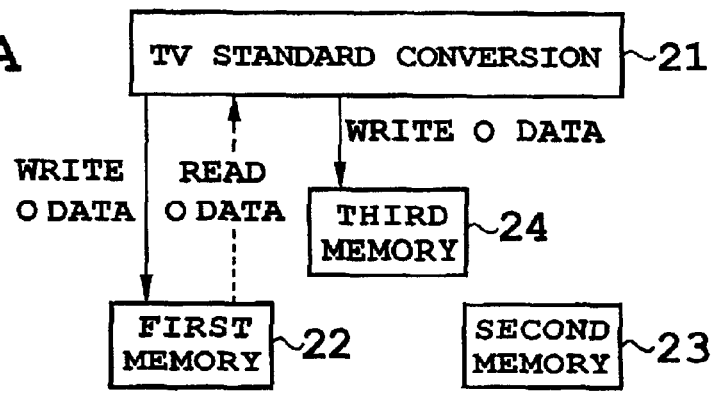
FIGS. 2A to 2C are explanatory diagrams for explaining a write operation and a read operation at the time of television standard conversion for each memory in this embodiment of the invention.
Figure 2B:
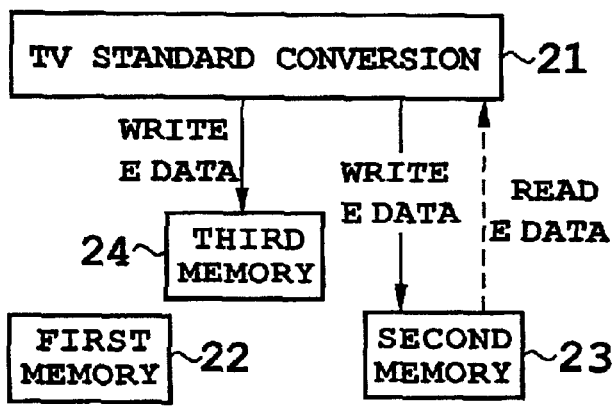
Figure 2C:
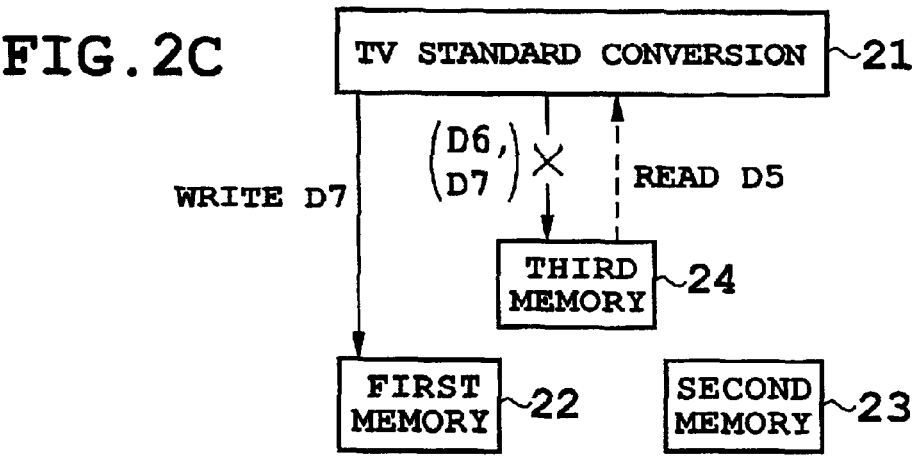

FIGS. 2A to 2C show the writing and reading processes for each of the memories 22 to 24 in making the TV standard conversion. As shown in FIG. 2A, the odd field data (O data) is written at a timing of the NTSC system (vertical scanning period of 1/60 sec.) into the first memory 22 and the third memory 24 simultaneously, and thereafter, this O data is usually read from the first memory 22 at a timing of the PAL system (vertical scanning period of 1/50 sec.). Also, the even field data (E data) is written at a timing of the NTSC system into the second memory 23 and the third memory 24 simultaneously, and thereafter, this E data is usually read from the second memory 23 at a timing of the PAL system, as shown in FIG. 2B.

And, for the data in a period for which the writing of the new data D7 overtakes the reading of the odd field data (D5) from the first memory 22, the writing of the data D6 and D7 into the third memory 24 is inhibited, and the data D5 is read from the third memory 24, as shown in FIG. 2C. This will be described below in detail by reference to FIG. 3 and FIGS. 4A to 4C.

Figure 3:
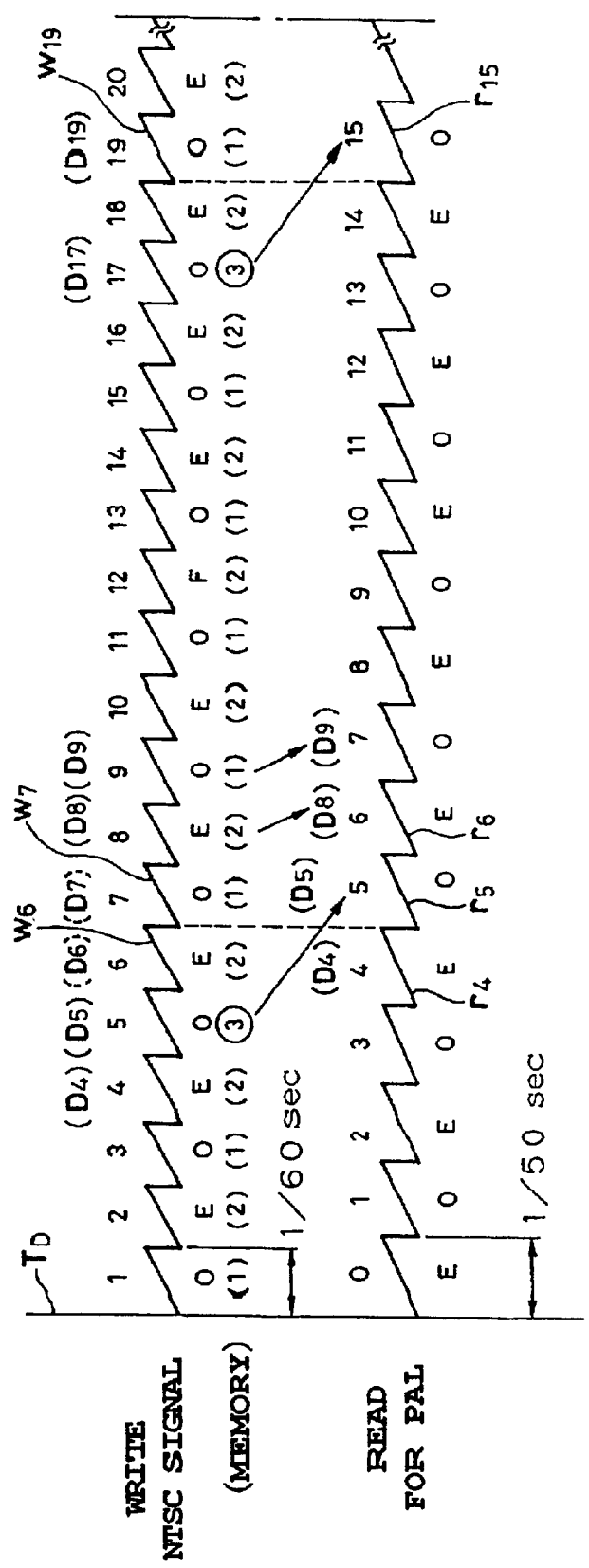
FIG. 3 is a chart showing a write timing of an NTSC signal and a read timing for a PAL system conversion in the embodiment of the invention.
Figure 5A:
FIGS. 5A and 5B are charts showing a vertical scanning signal for each television system.
Figure 5B:
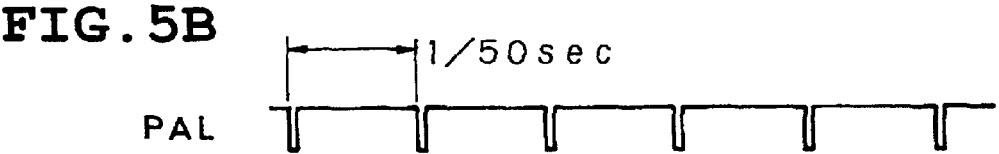
Figure 6:
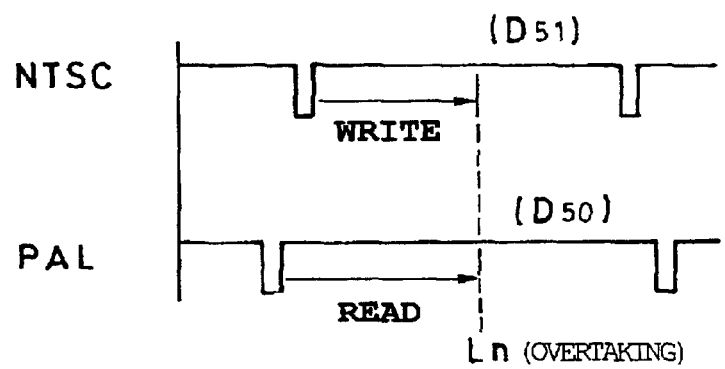
FIG. 6 is a chart showing a state in which the write operation of the video signal data overtakes the read operation in the conventional NTSC-PAL conversion memory.

FIG. 3 shows the write timing of NTSC signal and the read timing of PAL conversion. In the NTSC to PAL conversion, the writing of data D7 overtakes the reading of data D5 at a position of the fifth read period $r_5$ for the PAL conversion or the seventh write period $W_7$ of the NTSC signal, and the writing of data D19 overtakes the reading of data D15 at a position of the read period $r_{15}$ or the write period $w_{19}$. At this time, the field data D5, D17 is read from the third memory 24, but not the first memory 22.

That is, the write and read operations in the first to third memories 22 to 24 are shown in FIGS. 4A to 4C. In FIG. 4A, the writing of data D7 (period $w_7$) overtakes the reading of data D5 (period $r_5$) in the first memory 22. As shown in FIG. 4B, after the odd field data D5 is written in the third memory 24, the writing of data D6 and D7 for the periods $w_6$ and $W_7$ is inhibited, and the data D5 is read. Accordingly, in this embodiment, the data are read in the order of D4, D5, D8 and D9, and the data D6 and D7 are cut. That is, the next data is read in the form of skipping one frame at the time of overtaking.

Also, the odd field data D17 is processed in the same way. Further, in the case where the writing overtakes the reading for the even field data stored in the second memory 23, the third memory 24 is employed to acquire the necessary data. Since the information as to the write inhibit period of the third memory 24 that is grasped by the microcomputer 25 is set up within a predetermined time, the write inhibit of the third memory 24 and the reading of the data from the third memory 24 for that period are repeated by making a reset to the start point $T_D$ of FIG. 3 for every predetermined period of time.

The field data read in the above manner is converted into the field signal (625/2 horizontal lines) for the PAL system through the interpolation process by the TV standard conversion circuit 21, and finally supplied as a frame signal of 625 horizontal lines to the PAL monitor. As a result, an image of the observed subject with horizontal bar noise suppressed is displayed on the PAL monitor.

In this embodiment, the use of the third memory 24 provides the following advantages. That is, the data D6 in the sixth period $w_6$ of the NTSC signal can be read as the data in the period $r_5$ for the PAL system, but because all the periods $r_4$ to $r_6$ for the PAL system become the even field data (D4 to D6 to D8), there is a disadvantage that the vertical resolution is decreased, as can be seen from FIG. 3 and FIGS. 4A to 4C. However, in this invention, since the odd and even field data are alternately arranged by using the third memory 24, the required data, or the odd field data in this case, can be acquired, whereby the vertical resolution is not degraded.

In this embodiment, the conversion from the NTSC system to the PAL system has been described, but the present invention may be applied to the conversion from the NTSC system to the other TV standard.

As described above, with this embodiment of the invention, the third memory is employed to read the data during a period for which the writing of the next data overtakes the reading of the data from the first and second memories, whereby a video signal of the NTSC system is converted into a video signal of the PAL system. In this manner, it is possible to display an excellent video on the monitor of the PAL system by suppressing the bar noise that occurs in making the television standard conversion.

What is claimed is:

1. A television standard converter for an endoscope, comprising:

an image pickup element drive circuit for driving an image pickup element based on an NTSC system;

a video signal processing circuit for forming a video signal of an observed subject on the basis of an output signal of said image pickup element;

a main memory for memorizing the video signal data acquired at a timing of the NTSC system in sequence;

an auxiliary memory for memorizing the same video signal data stored in said main memory simultaneously; and a conversion circuit for converting a video signal of the NTSC system into a video signal of the other television standard, in which the video signal data is read from said main memory at a timing of the other television standard, and for the data in a period for which the writing of the next data overtakes the reading of the data from said main memory, the writing of the data into said auxiliary memory is inhibited, and the data is read from said auxiliary memory.

2. The television standard converter for endoscope according to claim 1, wherein said conversion circuit converts a video signal of the NTSC system into a video signal of a PAL system.

3. The television standard converter for endoscope according to claim 1, wherein said conversion circuit reads the video signal data memorized in said auxiliary memory to provide alternately an odd field data and an even field data output from said image pickup element.

* * * * *